(12) United States Patent
Duceppe

(10) Patent No.: US 7,712,557 B2
(45) Date of Patent: May 11, 2010

(54) ENDLESS BELT DRIVE FOR A VEHICLE

(75) Inventor: Daniel Duceppe, Rock-Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 11/765,234

(22) Filed: Jun. 19, 2007

(65) Prior Publication Data

US 2007/0240917 A1    Oct. 18, 2007

Related U.S. Application Data

(62) Division of application No. PCT/CA2005/001949, filed on Dec. 21, 2005.

(60) Provisional application No. 60/637,450, filed on Dec. 21, 2004.

(51) Int. Cl.
 *B62D 55/00* (2006.01)
(52) U.S. Cl. .................. 180/9.21; 180/9.3; 180/9.38
(58) Field of Classification Search ............... 180/9.21, 180/9.26, 9.3, 9.38, 9.44, 185, 190, 193, 180/184, 186; 305/124, 127
See application file for complete search history.

(56) References Cited

U.S. PATENT DOCUMENTS

| | | |
|---|---|---|
| 2,467,947 A | 4/1949 | Skelton |
| 3,369,624 A | 2/1968 | Kauffmann |
| 3,724,580 A | 4/1973 | Adams, Jr. |
| 3,841,424 A | 10/1974 | Purcell et al. |
| 3,938,606 A | 2/1976 | Yancey |
| 4,618,015 A | 10/1986 | Yochum |
| 4,635,740 A | 1/1987 | Krueger et al. |
| 4,683,970 A | 8/1987 | Smith |
| 4,699,229 A | 10/1987 | Hirose et al. |
| 4,706,769 A | 11/1987 | Latourelle et al. |
| 4,953,919 A | 9/1990 | Langford |
| 5,240,084 A | 8/1993 | Christianson |
| 5,273,126 A | 12/1993 | Reed et al. |
| 5,330,019 A | 7/1994 | Cartwright |
| 5,452,949 A | 9/1995 | Kelderman |
| 5,607,210 A | 3/1997 | Brazier |
| 5,950,748 A | 9/1999 | Matsumoto et al. |
| 5,979,580 A | 11/1999 | Suzuki et al. |
| 6,006,847 A | 12/1999 | Knight |
| 6,095,275 A | 8/2000 | Shaw |

(Continued)

FOREIGN PATENT DOCUMENTS

| | | |
|---|---|---|
| CA | 2188103 | 4/1997 |

(Continued)

OTHER PUBLICATIONS

International Search Report PCT/CA2005/001949, Apr. 20, 2006.

(Continued)

*Primary Examiner*—Tony H. Winner
(74) *Attorney, Agent, or Firm*—Osler, Hoskin & Harcourt LLP

(57) ABSTRACT

An endless belt system for a vehicle having a negative trail steering geometry is provided. The endless belt system replaces the wheels that steer a vehicle, particularly an all-terrain vehicle, to provide increased steerability and floatation over soft terrain.

8 Claims, 15 Drawing Sheets

U.S. PATENT DOCUMENTS

| | | | |
|---|---|---|---|
| 6,260,648 | B1 | 7/2001 | Bessette |
| 6,318,484 | B2 | 11/2001 | Lykken et al. |
| 6,401,847 | B1 | 6/2002 | Lykken |
| 6,547,345 | B2 | 4/2003 | Phely |
| 6,874,586 | B2 * | 4/2005 | Boivin et al. ............... 180/9.26 |
| 6,926,105 | B2 | 8/2005 | Brazier |
| 7,111,697 | B2 | 9/2006 | Brazier |
| 7,131,508 | B2 | 11/2006 | Brazier |
| 7,222,924 | B2 | 5/2007 | Christianson |
| 2003/0159859 | A1 | 8/2003 | Boivin et al. |
| 2003/0159860 | A1 | 8/2003 | Boivin et al. |
| 2004/0140138 | A1 | 7/2004 | Brazier |
| 2004/0159475 | A1 | 8/2004 | Moor, Jr. |
| 2006/0181148 | A1 | 8/2006 | Bessette |

FOREIGN PATENT DOCUMENTS

| | | |
|---|---|---|
| CA | 2214474 | 3/1998 |
| CA | 2140600 | 5/2006 |
| CA | 2495642 | 7/2006 |
| CA | 2533517 | 7/2006 |
| EP | 0270237 | 2/1988 |
| JP | 4257776 | 9/1992 |
| RU | 2147284 C1 | 4/2000 |
| RU | 33084 U1 | 10/2003 |
| SU | 1754558 A1 | 8/1992 |

OTHER PUBLICATIONS

"Triton All Terrain", http://www.tritonatv.com/, Dec. 14, 2004, pp. 1 to 4.

ATV Illustrated, "Track Plus", http://www.atvillustrated.com/industrynews/pressreleases/mattraks/6x6/info.html, Dec. 14, 2004, pp. 1 to 2.

English Abstract of Application No. SU1754558, Published on Aug. 15, 1992.

English Abstract of Application No. RU2147284, Published on Apr. 10, 2000.

English Concise Explanation of the Relevance of Russian Patent 33084, done by Andrei Moskvitch; Mar. 10, 2009.

Original German Document and it's English Abridged Translation of pp. 328-329 and 344-345: "Automobile Chassis" Reimpell, Jornsen; Mashinostroenie (The Mechanical Engineering Publishers); 1983; done by V.P. Agapov, Edited by I.N. Zverev, Moscow.

* cited by examiner

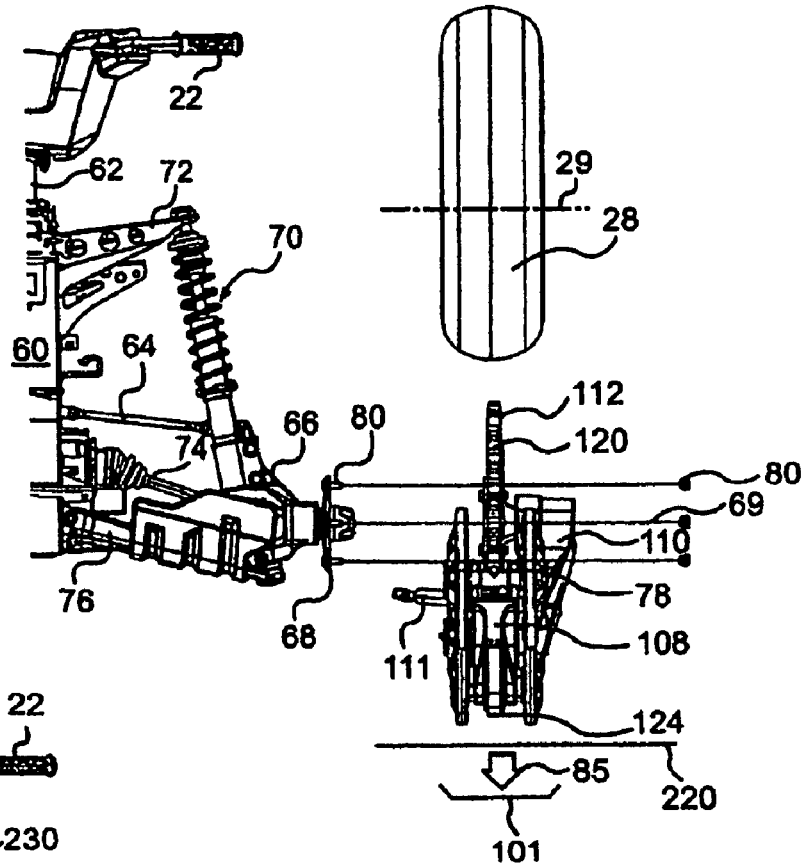
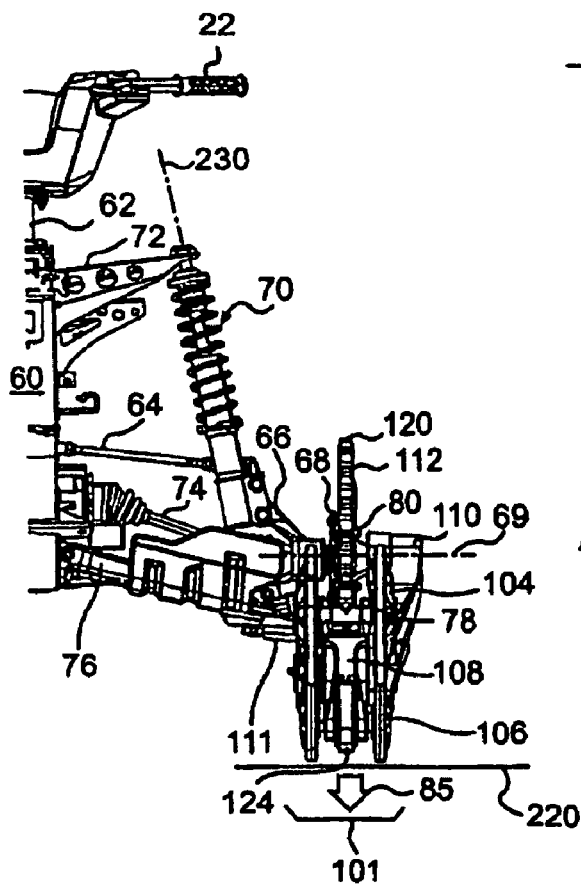
FIG. 3a
FIG. 3b

ENDLESS BELT DRIVE FOR A VEHICLE

CROSS-REFERENCE TO RELATED APPLICATIONS

The present application is a division of International Application PCT/CA2005/001949, entitled ENDLESS BELT DRIVE FOR VEHICLE, with an International filing date of Dec. 21, 2005. Through that International Application, the present application claims the priority of U.S. Provisional Patent Application Ser. No. 60/637,450, entitled ALL-TERRAIN VEHICLE WITH TRACK, filed on Dec. 21, 2004. These applications are incorporated herein by reference in their entirety.

FIELD OF THE INVENTION

This invention relates to endless belt drive systems for vehicles, and specifically to those endless belt drive systems which pivot in order to steer the vehicle to which they are attached.

BACKGROUND OF THE INVENTION

All-terrain vehicles are one kind of straddle type vehicle, so called because they have a straddle seat that supports at least one rider sitting in a straddle fashion. These vehicles have generally, although not necessarily, four wheels contacting the ground and supporting the vehicle via a suspension. An engine, supported by the frame, is operatively connected to at least one of the wheels to propel the vehicle. Handlebars are typically pivotally connected to the frame in front of the straddle seat and are operatively connected to the front wheels to steer the vehicle. Fenders and fairings offer protection for the rider against projectiles from the wheels when the vehicle is in motion.

As their name would suggest, all-terrain vehicles are designed to travel over various types of terrain. To that end, they are generally equipped with low pressure tires (i.e. "balloon tires" generally having a pressure less than 138 kilopascal (or 20 psi) which have a large contact patch with the ground. This large contract patch reduces the pressure exerted on the ground by the tire. This low pressure applied on the ground is advantageous for these vehicles as it allows them to go over soft terrain like mud, sand or snow.

Particularly with reference to snow-covered terrain, these balloon tires are not an Iways optimal as on snow it becomes increasingly difficult for the vehicle to move when the thickness of snow on the ground becomes significant. This is so because, depending on the snow conditions, it may happen that pressure applied on the snow surface by even the balloon tires becomes too great to support the vehicle. The tires thus begin to sink in the snow. The further the tires sink into the snow the more likely that the lower portion of the frame of the vehicle will come into contact with the snow surface. This situation is not at all desirable as when the frame touches the snow on the ground it begins to direct transfers the load of the vehicle onto the snow surface. Friction between the frame and the snow on the ground creates drag when the vehicle moves. The pressure provided on the ground by the tires progressively diminishes and traction may be subsequently lost in favor of greater contact between the lower portion of the frame and the ground.

Moreover, the wheels have less traction when the drag increases and their friction with the snow surface diminishes. The tires begin to slip over the ground surface while the vehicle becomes more and more supported by the frame contacting directly the snow on the ground, until the tires completely loose traction on the snow—the vehicle is then struck.

An alternative known in the art provides an replacing the wheels with an endless belt system (or track systems) when the vehicle is to be used in snowy conditions. Many types of such systems exist. For example, some endless belt systems have been designed to be added over the wheels of an all-terrain vehicle. Sometimes the addition of either a number of additional wheels or a track supporting structure is required to be added to the existing vehicle. Other endless belt systems have been designed to completely replace the wheels.

Replacement of the wheels by endless belt systems provides a larger contact area (patch) on the ground compared to size of the contact area (patch) of a wheel on the ground—even with a low pressure balloon tire. Floatation over the snow is increased and the lower portion of the frame is maintained at a greater distance from the snow surface. The vehicle can be used in deeper snow because floatation and traction are preserved.

These systems, while good, are not without their drawbacks. For one, the size of the contact patch also affects the ease of steering the vehicle. On a wheeled or tracked vehicles, the wheels that steer the vehicle are turned about a pivot point on the ground (more precisely over the steering axis) based on the steering geometry of the vehicle. The contact area of the wheel or track that surrounds the pivot point on the ground of the steering wheels opposes, via friction, the rotational movement of the wheel or track about this pivot point. Thus, the larger the contact area on the ground the more area there is to generate friction which opposed the movement about the pivot point, and the tougher it is to rotate the patch around the pivot point. Therefore, the larger contact area on the ground generated by an endless belt system inherently increases the force needed to steer the vehicle.

Another difficulty is that some endless belt systems are fixedly connected to the frame of the vehicles. This prevents the systems from tracking the shape of the uneven terrain over which the vehicle is traveling. In prior art systems that are pivotally attached the to frame, in the past, they have always been pivotally attached about what would have been the hub of the wheel if a wheel had been attached. This means that the system must have rather large movements in order to track the shape of the terrain, which is still not optimal. In other type of system, the traction provided is thus somewhat limited because the contact area of the endless belt is not capable of adapting to the ground's imperfections.

Finally, normally these endless belt systems are used on vehicles that were designed to accommodate wheels. These belt systems are sold typically in the aftermarket by those other than the original equipment manufacturers. Thus, the suspension, drive train, steering linkages, etc. have all been designed to sustain the loads generated by wheels, and not necessarily by belt systems. Belt systems typically generate higher mechanical loads as they are heavier than wheels and require more force in order to steer. In some circumstances, on some vehicles, improvement is required in order to sustain such loads.

Accordingly, there remains a need for an improved endless belt system for vehicles, and particularly all-terrain vehicles, which ameliorates some of the deficiencies associated with prior art systems.

SUMMARY OF THE INVENTION

The present invention attempts to ameliorate some of such aforementioned deficiencies. It should be noted that various features of the present invention are herein described. It should be understood that while each feature contributes to an aspect of the present invention, the present invention has many aspects. Thus, it is not necessary for all features to be present in every embodiment. In this respect, it is not necessary that every embodiment make ameliorations to or alleviate every drawback herein noted with respect to the prior art.

Accordingly, in one aspect, one or more embodiments of the present invention provide a drive system suitable for use on a vehicle having:

a frame having a front portion, a rear portion and a longitudinal axis;
an engine supported by the frame;
a seat supported by the frame to accommodate a rider;
a manually-operable steering device pivotally connected to the frame to accept steering input from the rider;
the drive system comprising:
a drive-system frame operatively connectable to the frame of the vehicle so as to be capable of pivotal movement with respect the frame of the vehicle relative to the longitudinal axis of the vehicle such that the drive system may be pivoted to steer the vehicle, the drive system being operatively connectable to the steering device of the vehicle;
a ground-engaging endless belt movably disposed on the drive-system frame and operatively connectable to the engine to propel the vehicle; and
when the drive system is connected to the vehicle, and when the vehicle is on flat level terrain, the drive system has a steering axis, about which the drive system pivots to steer the vehicle, a load axis, being defined by the resultant load statically equivalent to the distribution of loads across a contact area of the endless belt with the ground, and a point of intersection of the mean load axis and the ground is longitudinally forward of a point of intersection of the projection of the steering axis onto the ground and the ground, whereby the drive system has a negative trail.

It should be noted that although the invention was described as have a particular utility with respect to all-terrain vehicles, it is contemplated that it could be applied to other types of vehicles experiencing similar drawbacks, such as tractors.

Preferably, a longitudinal distance between the point of intersection of the load axis and the ground and the point of intersection of the projection of the steering axis onto the ground and the ground is not greater than 250 mm. More preferably, this distance is not greater than 150 mm. Still more preferably, this distance is not less than 10 mm and not greater than 100 mm. Most preferably, it is not less than 40 mm and not greater than 45 mm.

It is also preferred the present drive systems further comprise a rail pivotally mounted to the drive-system frame about which the endless belt is disposed, and that the rail be pivotally mounted to the drive system frame about a pivot axis, and that the load axis intersects the pivot axis. It is also preferred that the pivotal movement of the rail about the pivot axis be limited by a stopper.

Additionally, it is preferred that the a belt tensioner be associated with the endless belt for maintaining a tension of the belt constant notwithstanding pivotal movement of the rail.

It is also preferred that a caster of the steering axis is positive. As was previously stated, the present invention has particularly utility on all-terrain vehicles that comprise:

a frame having a front portion, a rear portion and a longitudinal axis;
an engine supported by the frame;
a straddle seat supported by the frame to accommodate a rider;
a handlebar pivotally connected to the frame to accept steering input from the rider; and
a drive systems described hereinabove on both the front left side and front right side of the vehicle.

On such vehicles, it is preferred that a steering angle stopper limits a steering angle of at least one of the drive systems, the steering angle stopper being disposed on the vehicle such that a steering linkage of the vehicle does not bear a force created when the stopper is engaged.

In another aspect, one or more embodiments of the present invention provides a drive system suitable for use on a vehicle having:

a frame having a front portion, a rear portion and a longitudinal axis;
an engine supported by the frame;
a seat supported by the frame to accommodate a rider; and
a manually-operable steering device pivotally connected to the frame to accept steering input from the rider;

the drive system comprising:
a drive-system frame operatively connectable to the frame of the vehicle
  so as to be capable of pivotal movement with respect to the frame of the vehicle relative to the longitudinal axis of the vehicle such that the drive system may be pivoted to steer the vehicle, and
  so as to be incapable of pivotal movement with respect to the frame of the vehicle in a plane parallel to the longitudinal axis and normal to the ground when the vehicle is on flat level terrain and steered straight;
a rail pivotally mounted to the drive-system frame;
a ground-engaging endless belt in sliding engagement with the rail such that a ground contact area of the belt is below the rail when the vehicle is on flat level terrain, the belt being operatively connectable to the engine to propel the vehicle; and
the drive system being operatively connectable to the steering device of the vehicle.

In such aspects, it is preferred that the drive system further comprises a plurality of wheels about which the belt is disposed, and that the wheels are associated with the rail so as to pivotally move in unison therewith respect to the drive-system frame. A stopper may limiting pivotal movement of the rail. It is also preferred that a belt tensioner be associated with the endless belt for maintaining a tension of the belt constant notwithstanding pivotal movement of the rail.

It is preferred that the rail be pivotally mounted to the drive system frame about a pivot axis, and that a mean load axis, being the normal projection onto the ground of a mean load point of loads across the ground contact area of the belt with the ground, intersects the pivot axis.

As was previously stated, the present invention has particularly utility on all-terrain vehicles that comprise
a frame having a front portion, a rear portion and a longitudinal axis;
an engine supported by the frame;
a straddle seat supported by the frame to accommodate a rider;
a handlebar pivotally connected to the frame to accept steering input from the rider;
a first drive system as recited above at a front left side of the vehicle; and
a second drive system as recited above at a front right side of the vehicle.

It is preferred that such vehicles have a steering angle stopper limiting a steering angle of at least one of the drive systems, and that the steering angle stopper is disposed on the vehicle such that a steering linkage of the vehicle does not bear a force created when the stopper is engaged.

In yet another aspect, one or more embodiments of the present invention provide a vehicle comprising:

a frame having a front portion, a rear portion and a longitudinal axis;

an engine supported by the frame;

a seat supported by the frame to accommodate a rider;

a manually-operable steering device pivotally connected to the frame to accept steering input from the rider;

a suspension system movably connected to the frame, the suspension system including a shock absorbing element;

a drive system connected to the suspension system and capable of pivotal movement with respect to the longitudinal axis of the frame to steer the vehicle, the drive system operatively connected to the steering device, the drive system having:

a plurality of wheels;

ground-engaging endless belt rotatable about the plurality of wheels;

a steering angle stopper limiting a steering angle of the drive system, the steering angle stopper disposed on the vehicle such that a steering linkage of the vehicle does not bear a force created when the stopper is engaged.

It is preferred that the drive system further comprises a rail with which the belt is in sliding engagement.

Preferred mounting positions for the stopper are on the frame, the drive system, and the suspension.

As was previously stated, the present invention has particularly utility on all-terrain vehicles wherein the seat is a straddle seat and the steering device is a handlebar.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

For a better understanding of the present invention as well as other objects and further features thereof, reference is made to the following description which is to be used in conjunction with the accompanying drawings, where:

FIG. 1 depicts an all-terrain vehicle with wheels on it and FIG. 2 depicts an all-terrain vehicle with an endless belt system replacing the wheels;

FIG. 2 depicts a left side elevation view of an endless belt system on a front-left portion of an all-terrain vehicle with a cut section allowing to see the steering linkage behind the track;

FIG. 3a depicts a front elevation view of a left side of an all-terrain vehicle with an endless belt system aligned to be installed on a the front left hub of the all-terrain vehicle in replacement of the wheel;

FIG. 3b depicts a front elevation view of a left side of an all-terrain vehicle having a MacPherson suspension with an endless belt system installed on the front left spindle;

DETAILED DESCRIPTION OF PREFERRED EMBODIMENTS

Figure 1A:
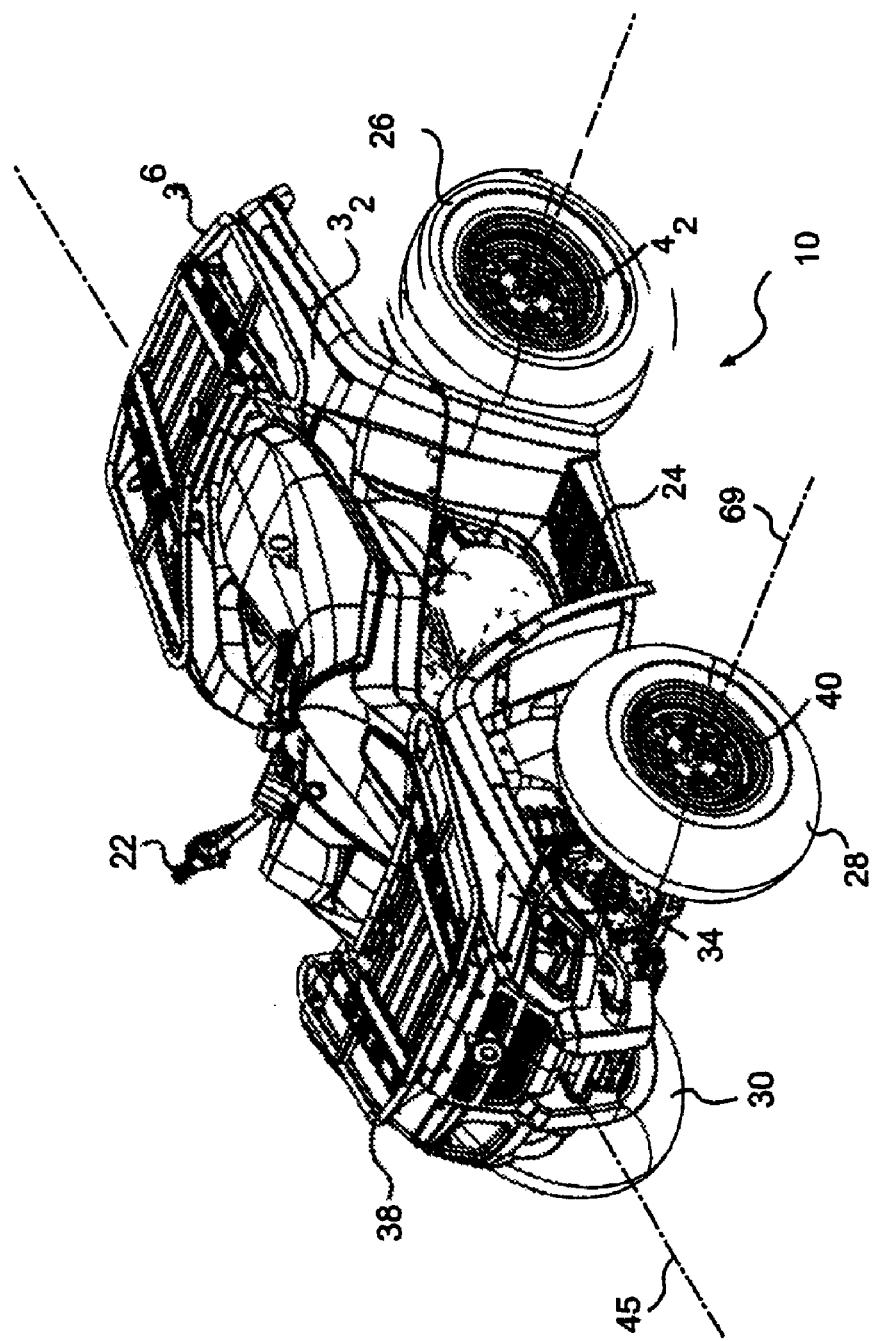
FIGS. 1a and 1b depict front-left side elevation views of an all-terrain vehicle according to one embodiment of the present invention.

FIG. 1a depicts an all terrain vehicle 10 having a straddle seat 20 to accommodate one or more riders. A rider (not shown) sitting in a straddle fashion may hold the handlebars 22 to steer the vehicle. The frame 60 is supported by four wheels (three of them are visible on FIG. 1a) 26, 28 and 30 spaced apart from a longitudinal axis 45 of the vehicle. The front wheels are associated with a front axle 40 and hub axis 69 and are operatively connected to the engine via a front drive system affixed to the front portion of the frame. The rear wheels are associated with a rear axle 42 and are operatively connected to the engine via a rear drive system affixed to a rear portion of the frame. In use, the rider puts his feet on footrests 24 disposed on each lateral side of the vehicle. The rider is protected against projections from the wheels by front fenders 34 and rear fenders 32. A front and a rear rack 38, 36 are convenient for carrying cargo on the vehicle.

Figure 1B:
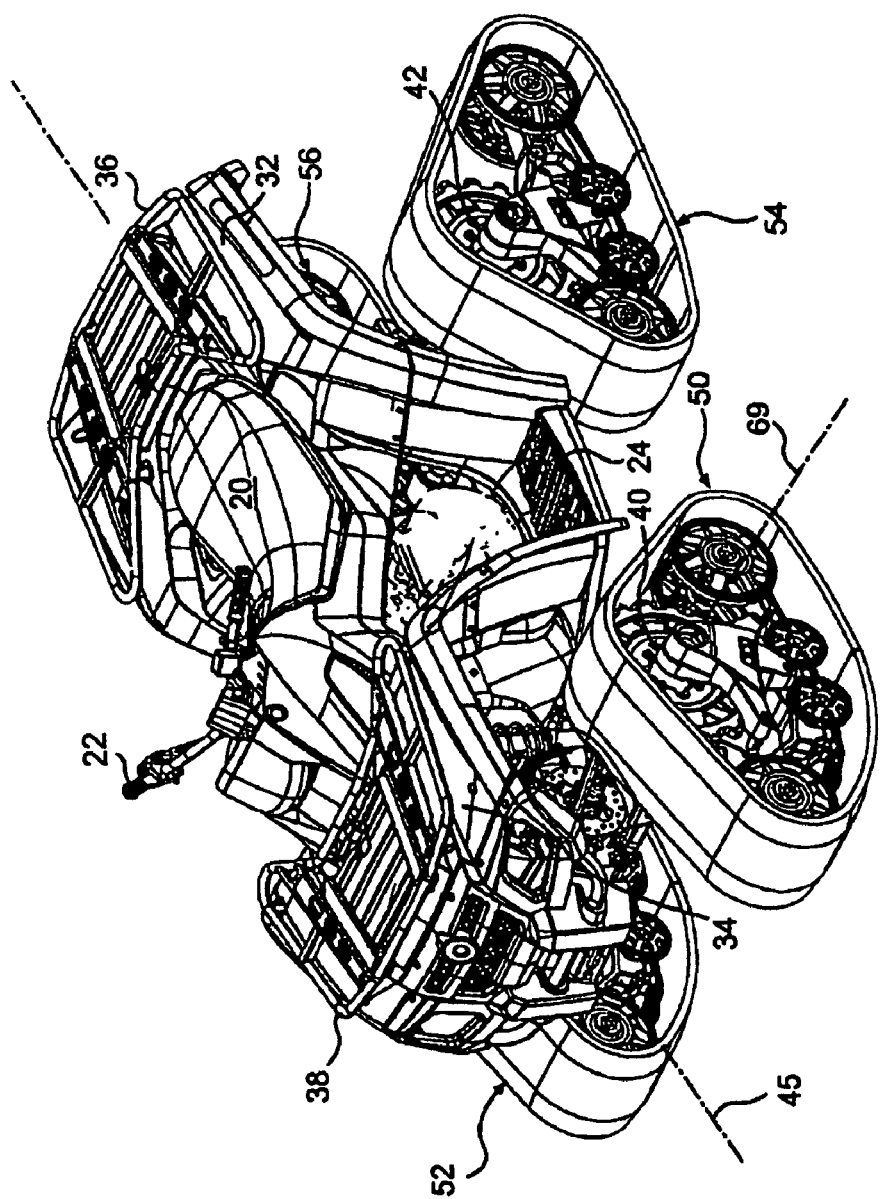

FIG. 1b illustrates an all-terrain vehicle with an endless belt system replacing each of the four wheels. Each endless belt system may be (but all are not required to be) operatively connected to the engine to propel the vehicle, provide traction to the vehicle and ensure maximum floatation and optimal traction on soft terrain. Endless belt system 50 has replaced the front left wheel while endless belt systems 52, 54 and 56 have replaced the front right wheel, the left rear wheel and the right rear wheel, respectively.

Figure 2:
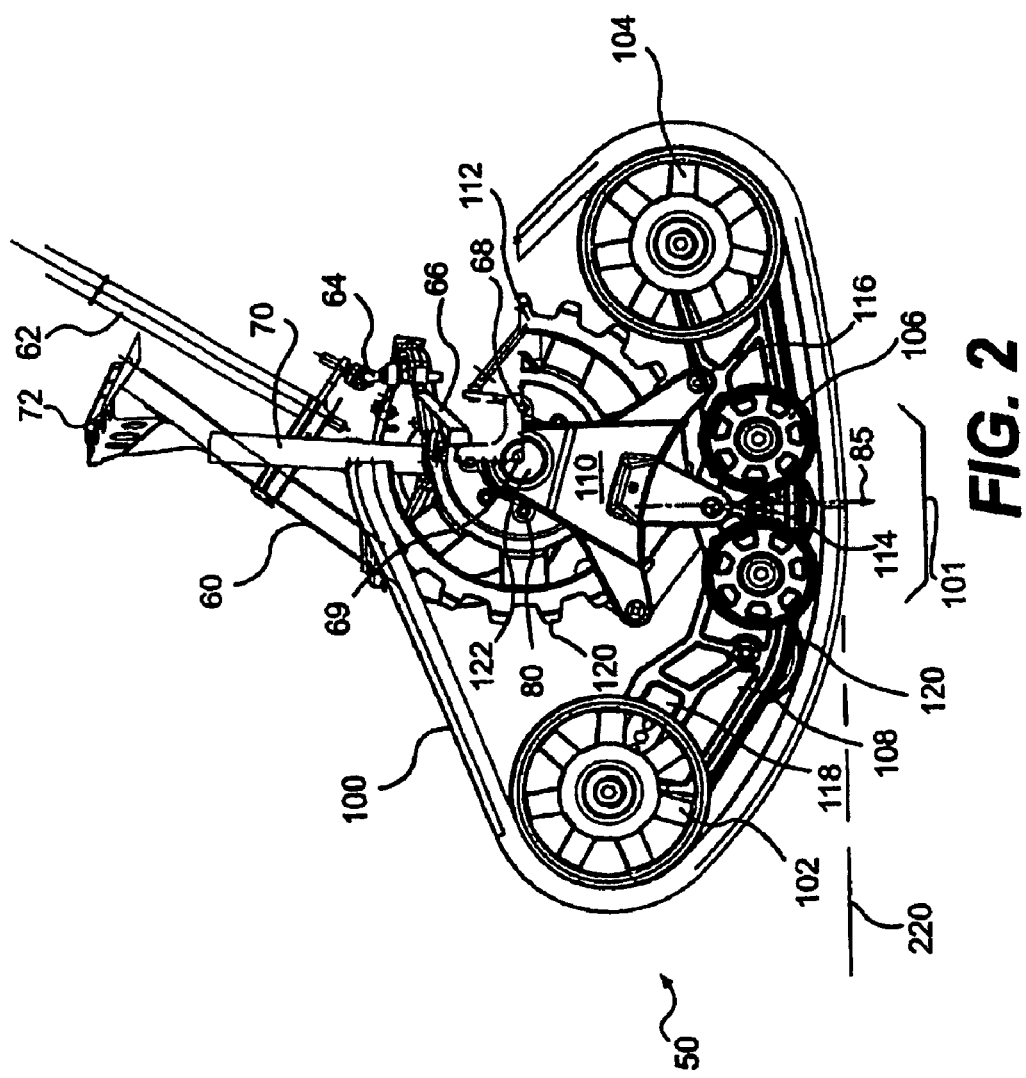

A more precise view of belt system 50 is presented in FIG. 2. Belt system 50 is removeably connected to hub 68 by fasteners 80. The hub 68 is rotatively held by knuckle 66. The hub 68 previously connected the front left wheel 28 to the vehicle and provided the rotational motion to the wheel. With the belt system 50, the rotational motion of hub 68 is transferred to sprocket wheel 112 that turns the endless belt 100 (or track) about hub axis 69 and sprocket axis 122 by knobs 120 which interface with corresponding structures on belt 100, similar to the rear drive system of a snowmobile. Endless belt 100 is maintained in place by sprocket 112 at the belt's then upper portion and by corner wheels 102, 104 at the then forward and rearward portions of the endless belt. Corner wheels preferably have a diameter of 25 cm however, different wheel diameters are considered within the scope of the present application. Support wheels 106 maintain the then bottom portion of belt 100 in place and limit the friction between the belt and rail 108 when supporting the vehicle on the ground.

The corner wheels 102, 104 and the support wheels 106 are maintained in their position by rail 108 and link 110 (which in this embodiment should be considered to be a frame). Support wheels of the present embodiment have a diameter of approximately 10 cm to 15 cm. Different wheel diameters could be used and be within the scope of the present application. The rail is pivotally mounted to link 110 thus allowing angular variations in the contact area 101 to allow the endless belt to follow imperfections or unevenness in the terrain over which the vehicle may be passing.

Link 110 is made by aluminum casting to achieve low cost, lightweight and rust resistance. Fiber-charged plastics (to yield improved stiffness) or other materials and/or processes could be used without departing from the scope of the present application. In the present embodiment rail 108 is made of UHMW via compression molding process.

Contact area 101 is to the endless belt what the contact patch is to a tire. The contact area is the portion of the endless belt that, is most of the time, in contact with the ground and through which (in most instances) the load is transmitted. (The pivotal movement of the rail will be discussed further in the description.) Link 110 is maintained by roller bearings (not shown on FIG. 2 but can be seen on FIG. 7) over hub axis 69 meaning the hub can turn sprocket 112 without turning link 110. Link 110 can therefore transmit the load applied to the track system by the vehicle from hub 68 and knuckle 66 and is prevented from turning by a separate anti-rotation connector 111 attached to the vehicle via spacer 140 (not shown on FIG. 2, can be seen on FIG. 6).

Still referring to FIG. 2, it should be noted that in most cases belt systems installed on the front portion of the vehicle need to be steerable. A steering column 62 connected on one end to handlebars 22 and on the other end to steering link 64 moves knuckle 66, as was the case when wheels were present on the vehicle. Also referring to FIG. 2, frame 60 is shown with top MacPherson suspension connector 72.

FIG. 3a depicts an unassembled endless belt system 50 replacing wheel 28. It is possible to see fasteners 80 on hub 68. The hub is rotated by half shaft 74 that transmits power from the engine via a front drive shaft and a front differential. It can be appreciated that the suspension system presented in the embodiment of FIG. 3a is a MacPherson type suspension. This suspension type has a shock absorber 70 (a strut) connected between the frame 60 (via connector 72) and the lower A-arm 76 (via knuckle 66). At the bottom of the rail is affixed slider 124, made of low friction material to reduce the friction between link 110 and endless belt 100 when the belt cannot be entirely supported by support wheels 106. Additionally, an adjustment mechanism 78 is provided to set the tension of endless belt 100 by moving the front and rear corner wheels apart. In this embodiment a bolt on adjustment mechanism 78 can be turned to adjust the position of the front corner wheels axle. This changes the peripheral distance over all corner wheels, support wheels and the sprocket. The endless belt can therefore be removed from the mechanical structure of the track system for maintenance and put back in place with the adequate tension.

FIG. 3b depicts the track system of FIG. 3a installed on the left front hub of the all-terrain vehicle. The anti-rotation connector 111 connects the link 110 to the lower A-arm 76 to prevent relative movements between the link and the A-arm. The connection of anti-rotation connector 111 under lower A-arm 76 is preferably positioned in line with steering axis 230 (described later in this description) to avoid other movements of the endless belt system when the vehicle is steered. Should the connection of anti-rotation connector 111 not be in line with steering axis 230 the endless belt system would not move only accordingly to the steering movement.

The connection of the anti-rotation connector 111 to suspension arm 76 could be connected not in line with steering axis 230 and provide desirable effects. For instance, self centering of the steering can be augmented if the connection of the anti-rotation connector 111 to the vehicle is located next to the steering axis. This would slightly rotate link 110 over hub axis 69 when the vehicle is steered. Depending on the disposition of the anti-rotation link 111 on the vehicle, the rear angular limiter 116 contacts rail 108 thus moving down the rear end of the endless belt that is on the exterior side when riding the vehicle in a curve.

Figure 4A:
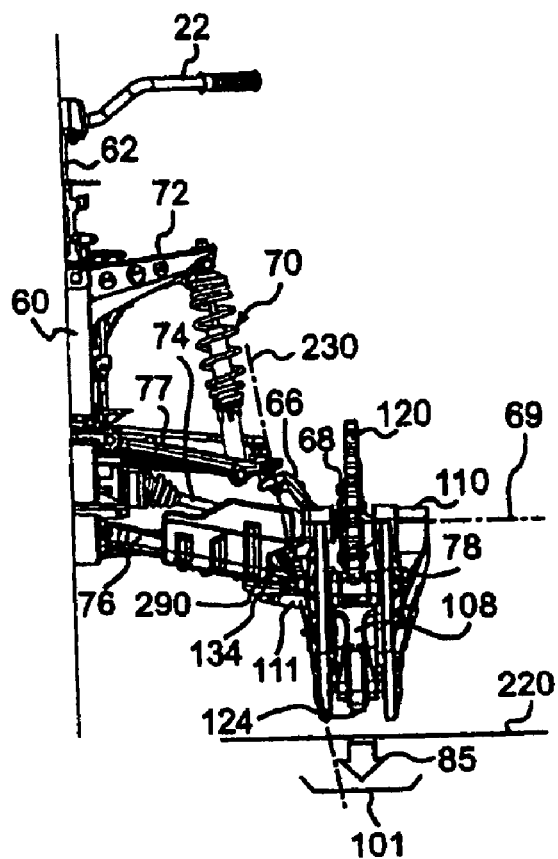
FIG. 4a depicts a front elevation view of a left side of an all-terrain vehicle having a double A-arms suspension with an endless belt system installed on the front left spindle.
Figure 4B:
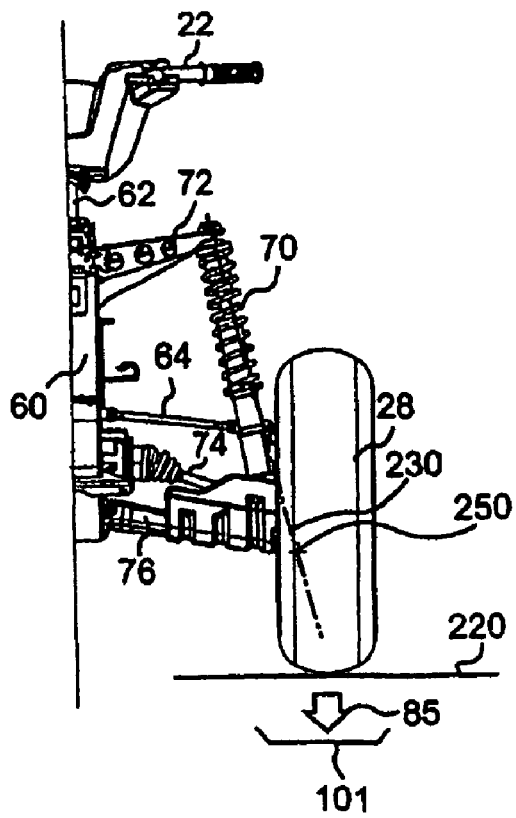
FIG. 4b depicts a front elevation view of a left side of an all-terrain vehicle having a MacPherson suspension with a wheel installed on the front left spindle.

FIG. 4a shows the same arrangement as presented on FIG. 3b but instead uses a double A-arm suspension configuration. Knuckle 66 is connected on its upper portion to top A-arm 77. The shock absorber 70 is connected at its upper extremity to connector 72 and connects the top A-arm 77 at its lower extremity. FIG. 4b depicts the same view as FIG. 3b with a wheel installed.

Figure 5A:
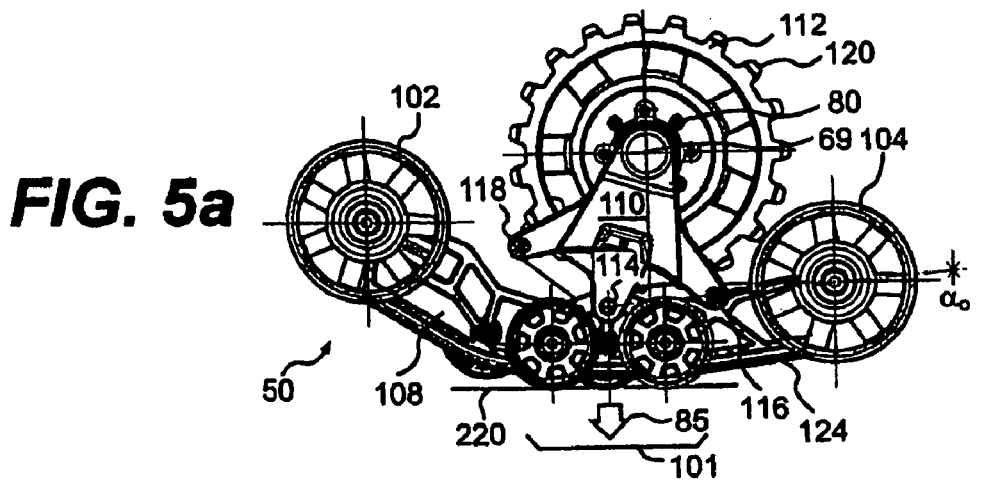
FIGS. 5a to 5c depict left elevation side views of front endless belt system depicting different angles for the endless belt system and its contact area.
Figure 5B:
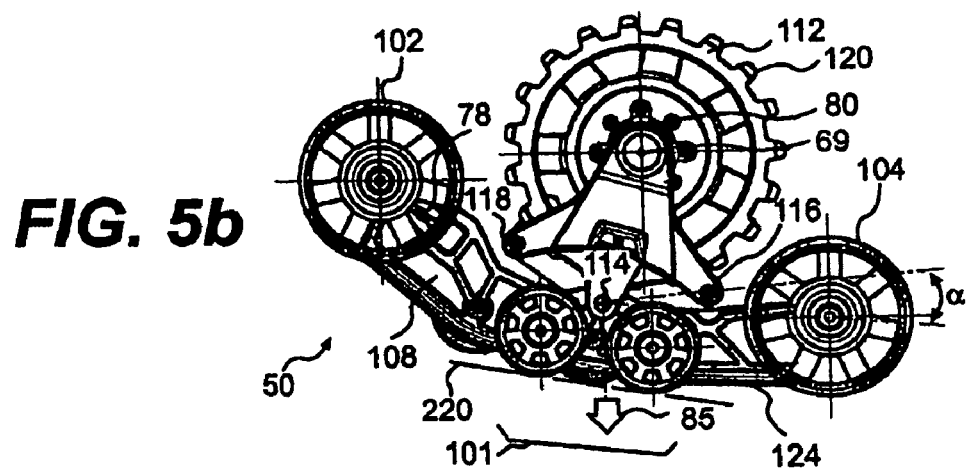
Figure 5C:
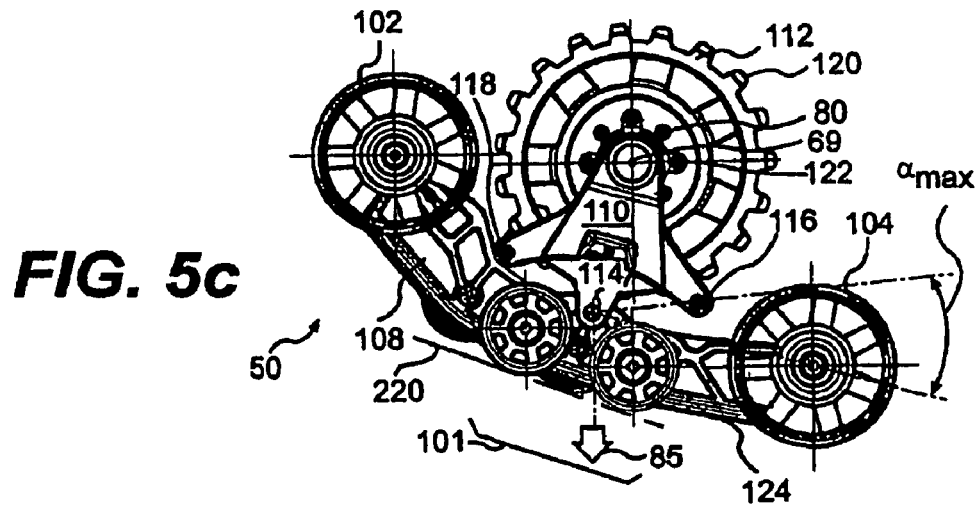

FIGS. 5a, 5b and 5c depict the pivotal movement of rail 108 in respect to link 110. The rail can pivot over pivot axis 114 and has two angular limiters defined as front link portion limiter 118 and rear link portion limiter 116. The pivotal movement is limited when either the front or the rear angular limiters 118, 116 enters in contact with rail 108. FIG. 5a shows the limit on one side of the pivotal motion; rear link portion 116 is in contact with rail 108 thus providing angle $\alpha_0=0°$. FIG. 5b presents an intermediate angle $\alpha$ in the pivotal motion; neither the front nor the rear link portions 118, 116 contact rail 108. This is the range where the endless belt system is used most of the time to align the angle of contact area 101 to the ground condition. FIG. 5c is the limit of the pivotal motion on the other side; front link portion 118 is in contact with rail 108 and $\alpha_{max}$=maximum angular displacement. In the present situation $\alpha_{max}$ is between 22° and 25°. At rest, on flat horizontal surface with contact area 101 substantially parallel with the ground, at $\alpha_0=0$, the rear link portion 116 is in contact with rail 108. This means the angular displacement is mostly done forward to improve stability. The angular displacement $\alpha$ disclosed in this embodiment is an example of an applicable displacement. The scope of the present invention encompasses other angular variations $\alpha'$ as well as other means for limiting the travel of the rail. Also, rail 108 in this embodiment maintains the endless track in position on the track system while allowing angular variation of the contact area's 101 of the endless belt. Further, the peripheral distance between sprocket 112, corner wheels 104, 104 and support wheels 106 remains substantially the same as the angle $\alpha$ varies. This prevent change in the endless belt tension. Also, the angle α is restricted to avoid the endless belt contacts the fenders of the vehicle.

Figure 6:
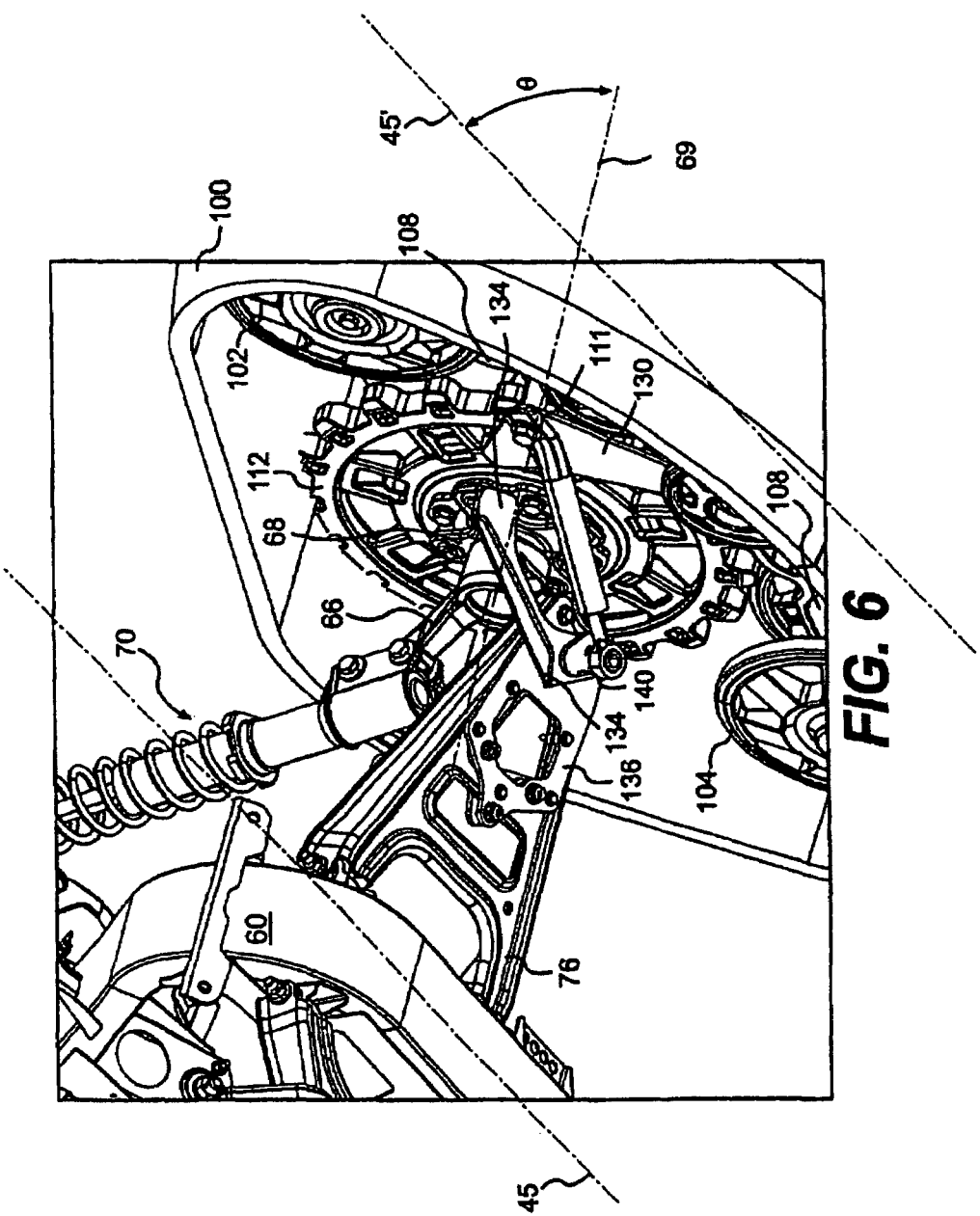
FIG. 6 depicts a bottom-right-front perspective view of an endless belt system installed on an all-terrain vehicle.
Figure 6A:
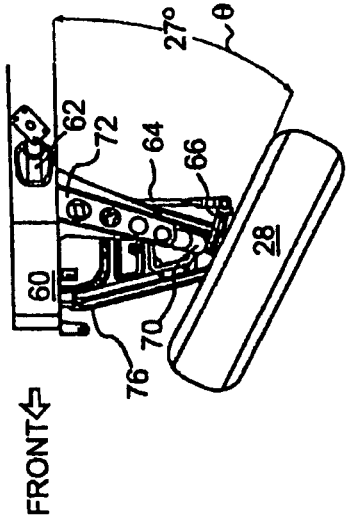
FIG. 6a depicts a top view of the left front side of an all-terrain vehicle with a wheel.
Figure 6B:
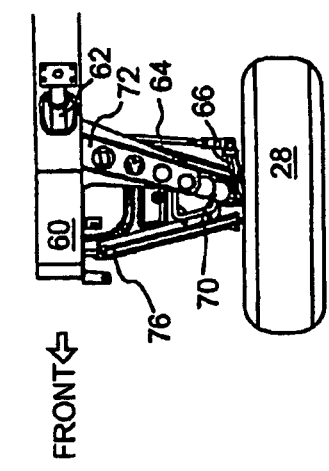
FIG. 6b depicts a top view of the left front side of an all-terrain vehicle with a steered wheel.
Figure 6C:
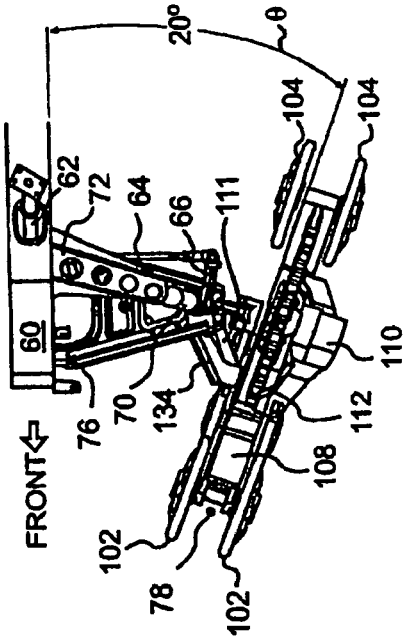
FIG. 6c depicts a top view of the left front side of an all-terrain vehicle with an endless belt.
Figure 6D:
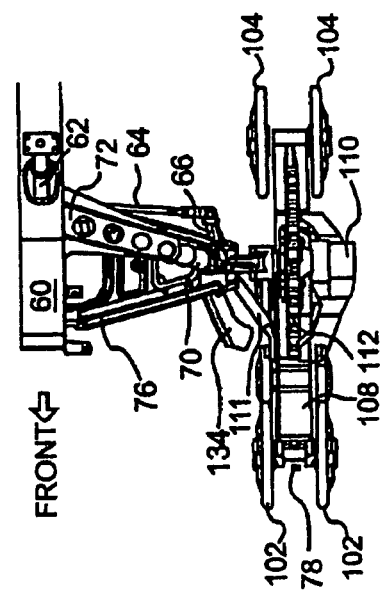
FIG. 6d depicts a top view of the left front side of an all-terrain vehicle with a steered endless belt.

The mass 85 of the vehicle is not transferred vertically in line with hub axis 69. Pivot 114 pivotally connecting rail 108 to link 110 is where the load of the vehicle 85 is vertically transferred to the ground when angle α is between $α_0$ and $α_{max}$. Therefore the load axis 85 falls in vertical line with pivot 114. When rail 108 reaches maximum angles $α_0$ and $α_{max}$ axis 85 moves from axis 114 because a portion of the load transfer between link 110 and rail 108 passes through front or rear angular limiters 118, 116. During normal operation, angle α does not, most of the time, reach its maximum value. FIG. 6 shows the under surface of the track system. Anti-rotation connector 111 ensures the track system will not turn over the hub axis 69 when sprocket 112 turns. Connector 111 is fastened on one end to the lower A-arm 76 and to link 110 via bracket 130. The anti-rotation connector is adjustable in length to allow modification of the link 110 angular position in respect to the lower A-arm 76. In this embodiment, a rod end is used to connect the anti-rotation connector to the A-arm for permitting rotation of the endless belt system when the vehicle is steered. A spacer 140 is also added to distance the connecting point of connector 111 on A-arm 76. This allows one to modify the movements of the endless belt system when the vehicle is steered.

Still referring to FIG. 6 a steering angle limiter 134 is provided to substantially reduce steering angle θ. There are greater forces and stresses on the mechanical parts when the vehicle is steered because of the increased friction provided by the endless belt system (in comparison to a wheel). The endless belt system installed on the vehicle is wider than a wheel. The enlarged distance between the outermost portion of the endless belt system and the steering axis changes the force ratio between the handlebars and the endless belt system. For at least these reasons, the steering linkages 64 and the half shafts 74 are substantially more stressed.

Now referring to FIGS. 6a, 6b, 6c and 6d, the steering angle limiter 134 in the present embodiment reduces of about 7° the steering angle θ on each side (from neutral to fully right hand turned for instance). The steering angle limiter 134 is disposed next to the track system to prevent high mechanical loads from reaching the steering linkage 64 and the steering column 62 by abutting against the bracket 130 which is fixed to the rail 108. It is possible to clearly see on FIG. 6d the angular stopper 134 contacting a portion of rail 108 thus limiting the steering movement of the endless belt system. Another way to limit the steering angle would be to use an augmented angular stopper on steering column 64. In the latter case all the efforts applied to the endless belt system would be supported by the steering linkage, which is undesirable. Moreover, steering angle limiter 134 of the present embodiment is fastened to lower A-arm 76, thus any undesirable forces coming from a sudden impact on the track system would be transferred to the A-arm 76 rather than to the steering components 64, 66, etc. It is therefore possible to remove steering angle limiter 134 to get back to the original steering geometry. This is useful when the vehicle alternates between the wheels and the endless belt systems depending on the ground conditions.

Figure 7:
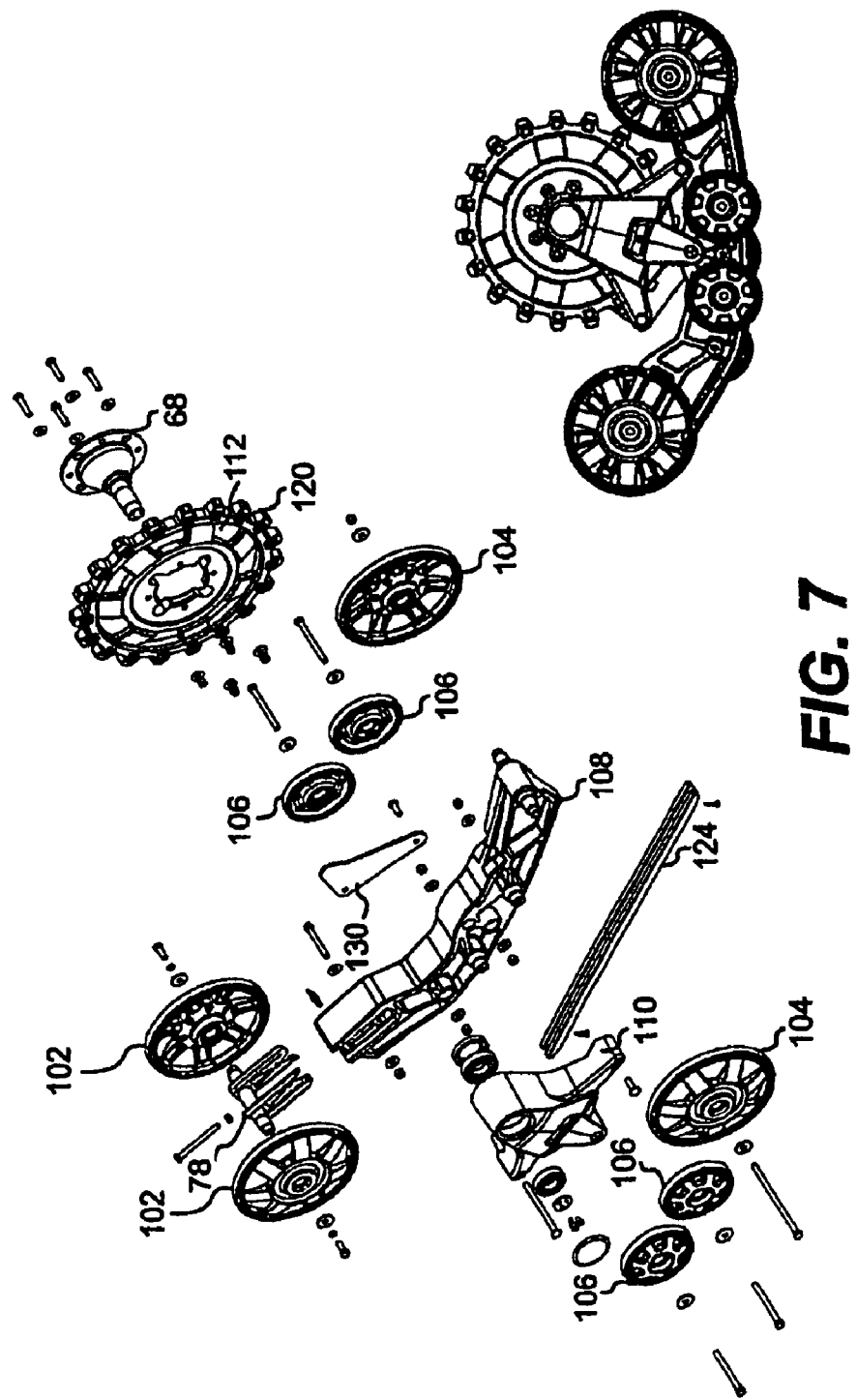
FIG. 7 depicts an exploded view of a front track kit.
Figure 8:
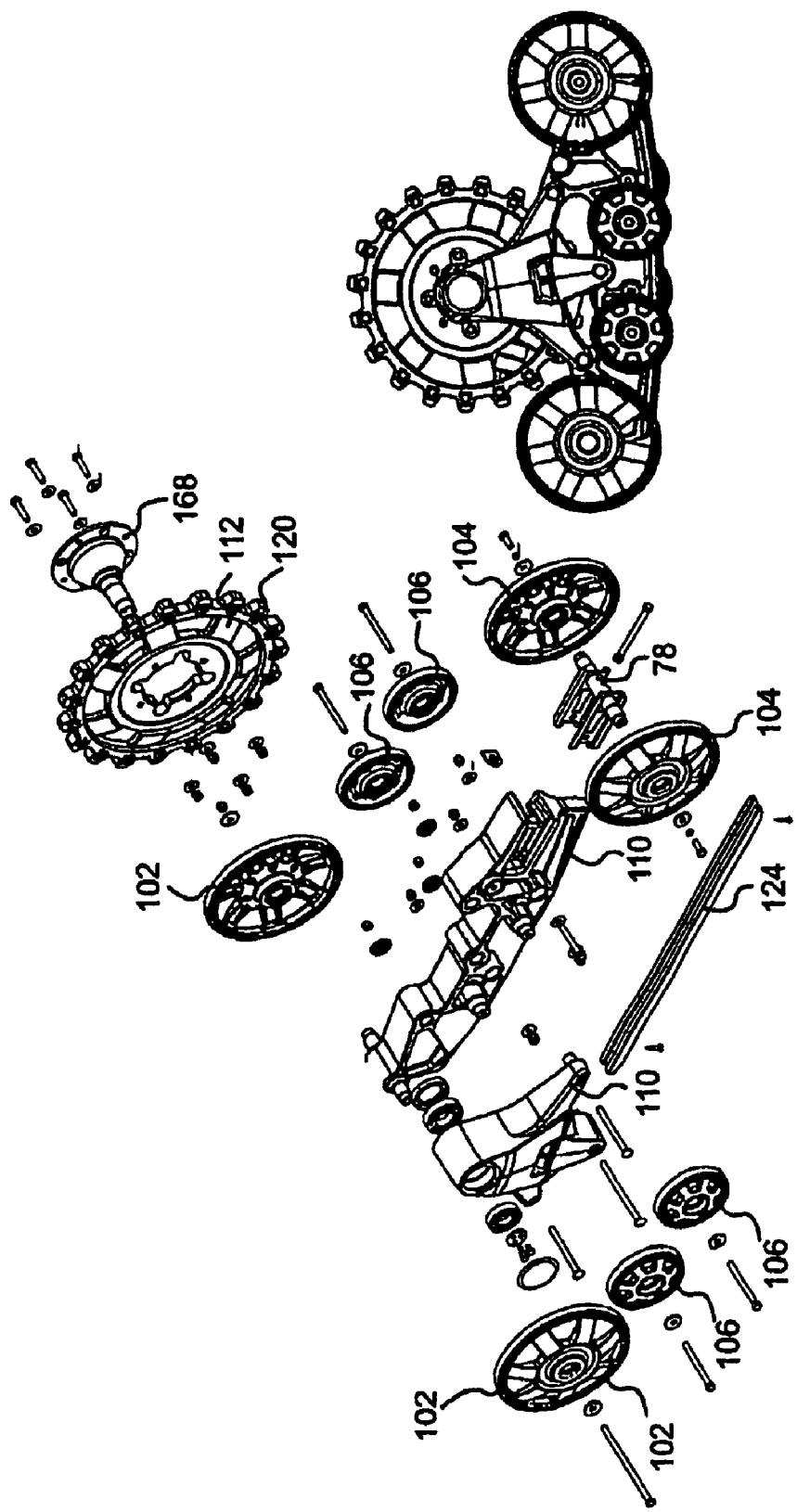
FIG. 8 depicts an exploded view of a rear track kit.

FIG. 7 is an exploded view of the endless belt system designed to be installed in replacement of steering wheels. FIG. 8 is an exploded view of the endless belt system designed to be installed in replacement of non-steering wheels; in the present situation on the rear axle. The main difference between the endless belt system replacing steering wheels and the endless belt system replacing non-steering wheels is that the rail 108 of the endless belt system for non-steering wheels is not pivotally connected to the link 110. Either, or both, the front or rear link portions 116, 118 are fastened to rail 108 on endless belt systems to be installed on non-steering wheels. The pivotal movement is therefore only possible, in this embodiment, for endless belt systems installed in replacement of steering wheels to achieve the results that will be described further in this text.

There are three main parameters on wheeled vehicle suspension and steering geometry: toe, camber and caster. Endless belt systems have different geometrical parameters than do wheels. This has an effect on the vehicles to which they are attached's behaviors. The larger contact area with the ground makes track systems harder to turn over the steering axis 230 (or caster axis). Caster is the angle to which the steering pivot axis is tilted forward or rearward from vertical, as viewed from the side. If the pivot axis is tilted backward (that is, the top pivot is positioned farther rearward than the bottom pivot), then the caster is positive; if the pivot axis is tilted forward, then the caster is negative. Positive caster tends to straighten the wheel when the vehicle is traveling forward, and thus is used to enhance straight-line stability. The forces that causes the wheel to follow the steering axis is proportional to the distance between the steering axis and the wheel's load axis (which in the context of the present application should be understood to be the mean load axis, being the normal projection onto the ground of a mean load point of loads across the ground contact area of the endless belt with the ground), the greater the distance, the greater the force. This distance is referred as "trail". When the steering axis intersects the ground in front of the load axis the trail is referred as a positive trail as opposed to negative trail which when the steering axis intersects the ground behind the load axis.

Most wheeled vehicles use a positive trail for the reasons stated above. A negative trail on a wheeled vehicle would likely provide instability because the steering wheels would tend to completely turn 180° over the steering axis. Nonetheless, the present inventors have realized that this force pushing the wheel to turn (with a negative trail) is helpful when applied with track systems. An endless belt system is quite different mainly because of its size (height, width) and its larger contact area with the ground. The much larger contact area 101 (patch) of an endless belt system provides resistance against rotational movement over the steering axis. This resistance is undesirable because it makes the endless belt system harder to steer, but it adds stability. A negative trail applied on an endless belt system uses this resistance caused by the contact patch friction with the ground and opposes the tendency to completely turn the track kit 180° over the steering axis to bring the steering effort to an acceptable level. In sum, the tendency to completely turn the track system 180° over the steering axis provided by the negative trail is damped by the higher friction generated by the large contact patch. An adequate negative trail provides a lighter steering effect without causing instability.

Figure 9A:
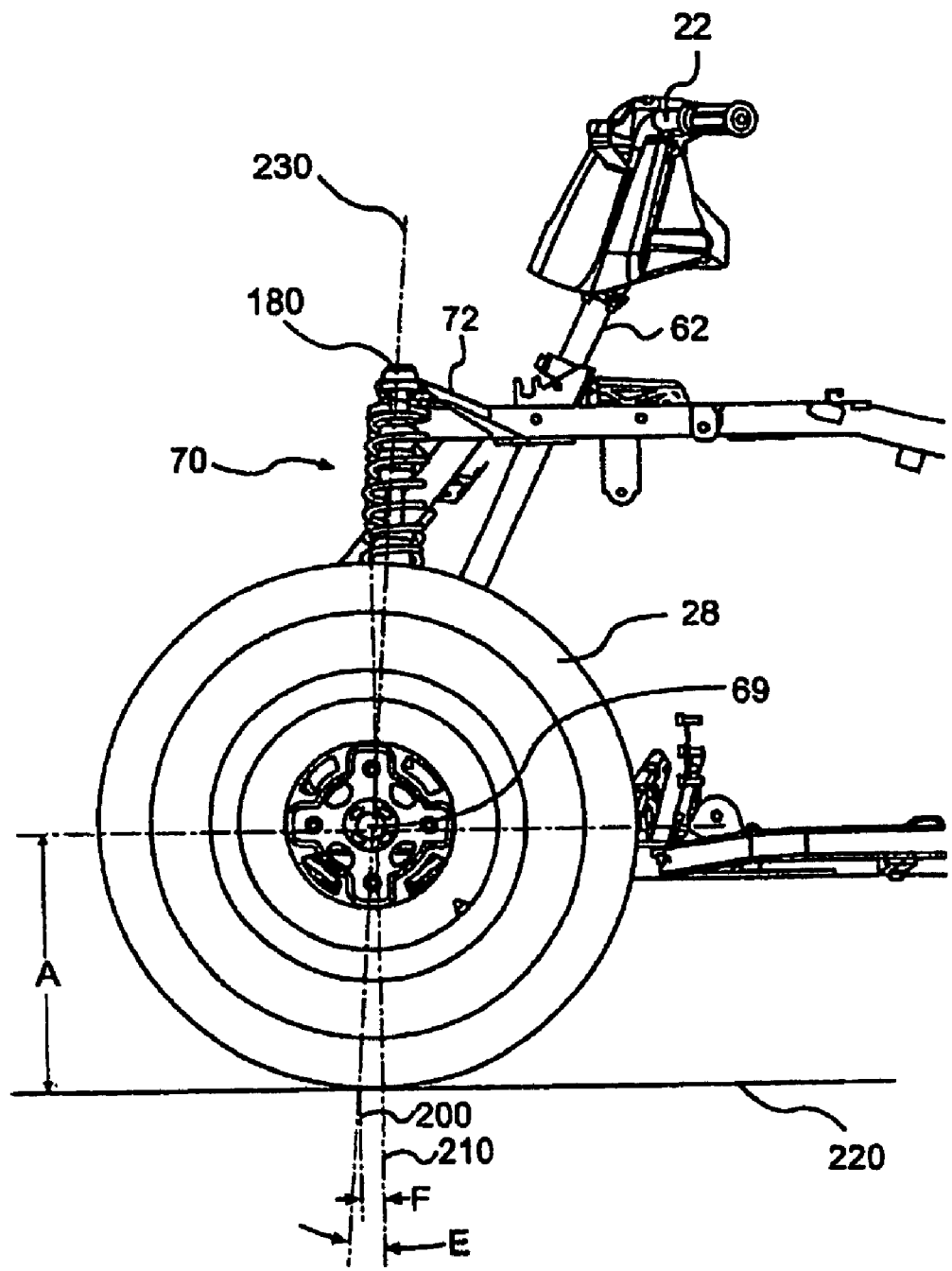
FIG. 9a depicts a left side elevation view of an all-terrain vehicle with wheel and tire installed and depicting different steering and suspension geometries.
Figure 9B:
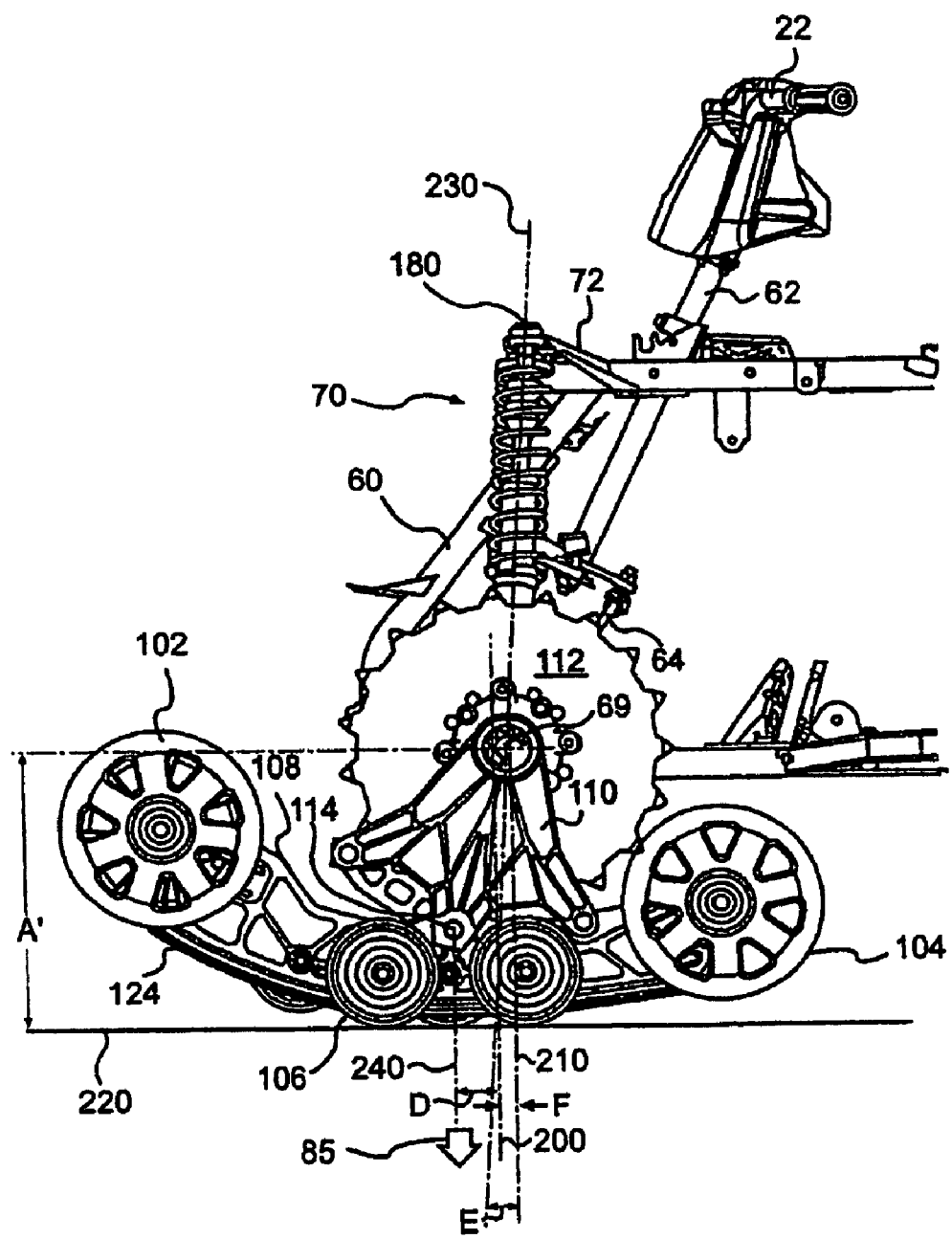
FIG. 9b depicts a left elevation view of an endless belt system installed on an all-terrain vehicle with the endless belt removed and depicting the different steering and suspension geometries.

FIGS. 9a and 9b depict left side elevation views of a front steering wheel and a front steering endless belt system on an all-terrain vehicle. On the wheeled vehicle of FIG. 9a the steering axis 230 is angled E in respect to vertical 210 from hub axis 69. Steering axis 230 passes along the top pivot point 180 and the lower pivot point (not shown) of the MacPherson suspension strut of this embodiment. The positive trail, distance in front of the true vertical projection 210 of the mass application on the ground, is indicated by identifier F. F being the distance between the vertical projection 200 of steering axis 230 intersecting ground level 220. The distance between the hub axis 69 and the ground 220 is indicated by identifier A.

On the vehicle with a track system of FIG. 9b the steering axis 230 is angled E in respect to vertical 210 from hub axis 69. This angle is no different from the wheeled vehicle because the suspension connections are not altered by the endless belt system. Steering axis 230 passes along the top pivot point 180 and the lower pivot point (not shown) of the MacPherson suspension strut of this embodiment. As opposed to the wheeled vehicle of FIG. 9b, the load 85 is applied on the ground with vertical load projection 240 originating from pivot 114. The vertical load projection 240 is considered instead of vertical projection 210 because the non rotatable link 110 pushes forward over pivot 114 the vertical application of the vehicle's load to the ground. The negative trail D is the distance between vertical projection 200 of steering axis 230 intersecting ground 220 (or contact area 101) and load projection 240. Negative trail D at ground level is preferably about 40-45 mm between steering axis 230 and the load axis 85. The distance between the hub axis 69 and the ground 220 is expressed by A'.

The anti-rotation connector 111 geometry in conjunction with the negative trail provides a more balanced steering. The negative trail helps the endless belt systems to rotate over steering axis 230 from its straight position and the anti-rotation connector 111 geometry conversely helps bring back straight the steering once turned.

Still referring to FIG. 9b, it is possible to notice the vertical elevation of both front and rear corner wheels 102, 106. The elevation of front corner wheels 102 from the ground helps maintain the endless belt system over the snow on the ground when the vehicle moves forward. The elevation of rear corner wheels 104 from the ground helps maintain the endless belt system over the snow on the ground when the vehicle moves rearward. Should rear corner wheels 104 be substantially at the same level as ground 220 the endless belt system would tend to dig in soft snow instead of floating over snow when moving rearward. The large diameter of corner wheels 102, 104 also help push more snow under the contact area of the endless belt system.

Figure 10A:
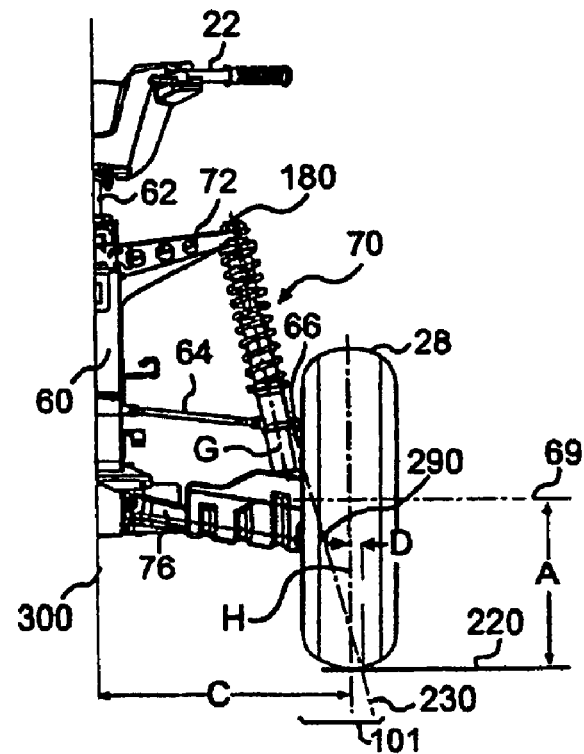
FIG. 10a depicts a front elevation view of the left side of an all-terrain vehicle with wheel and tire installed and depicting different steering and suspension geometries.
Figure 10B:
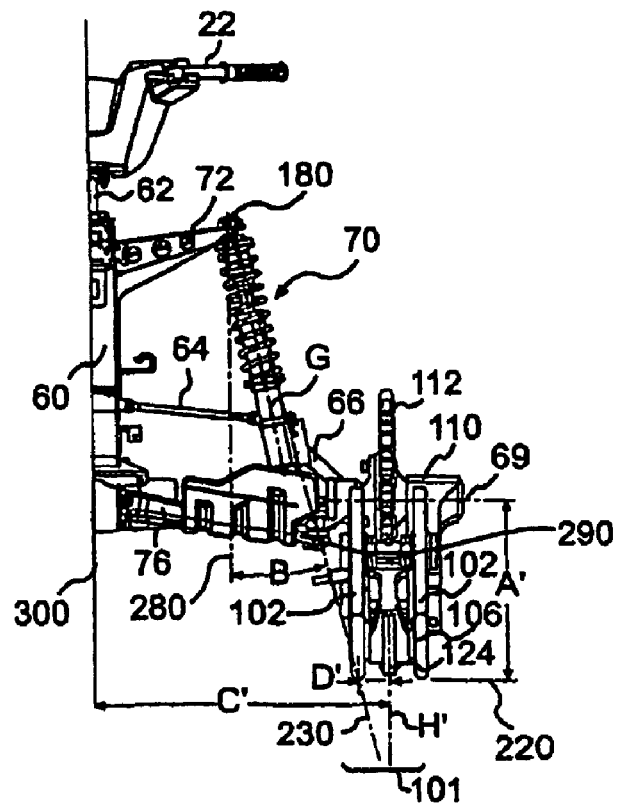
FIG. 10b depicts a front elevation view of an endless belt system installed on an all-terrain vehicle with the endless belt removed and depicting different steering and suspension geometries.

FIGS. 10a and 10b are respectively the side elevation views of FIGS. 9a and 9b. On these figures it is possible to appreciate the MacPherson type suspension with suspension strut 70 connected at its top portion to suspension connector 72 via top strut pivot 180 and pivotally connected at its lower portion, through knuckle 66, to ball joint 290. The axis defined by top pivot 180 and lower ball joint 290 is steering axis 230 over which the wheel or the endless belt system rotates to steer the vehicle. Angle B is the angle between the steering axis and vertical 280.

Distance D on FIG. 10a is the distance of the steering axis 230 to the center line of wheel 28 at ground level 220. Distance C is from the vehicle's center line 300 to the wheel center line H. Applied to the endless belt system depicted on FIG. 10b, distance D' is larger and on the opposite side (proximal side) of the endless belt system's contact area center line H' due to larger distance C' between the center of the vehicle 300 and contact area's center line H'. Distance A' between the hub axis 69 and ground 220 is also larger than distance A because the endless belt system is higher than a wheel. The resulting higher ground clearance may help circulating in deep snow while limiting the friction between the frame of the vehicle and the snow.

Endless belt systems installed in replacement of steering wheels on an all-terrain vehicle need to pivot over the steering axis to steer the vehicle. Usually, on most snow vehicles, like snowmobiles, endless belt propulsion mechanisms do not turn over a steering axis to steer vehicles. Skis in front of the vehicle provide steering or, on a multi laterally disposed endless belt propulsion systems, steering of the vehicle may be accomplished by speed differentiation between the different endless belt systems.

Figure 11A:
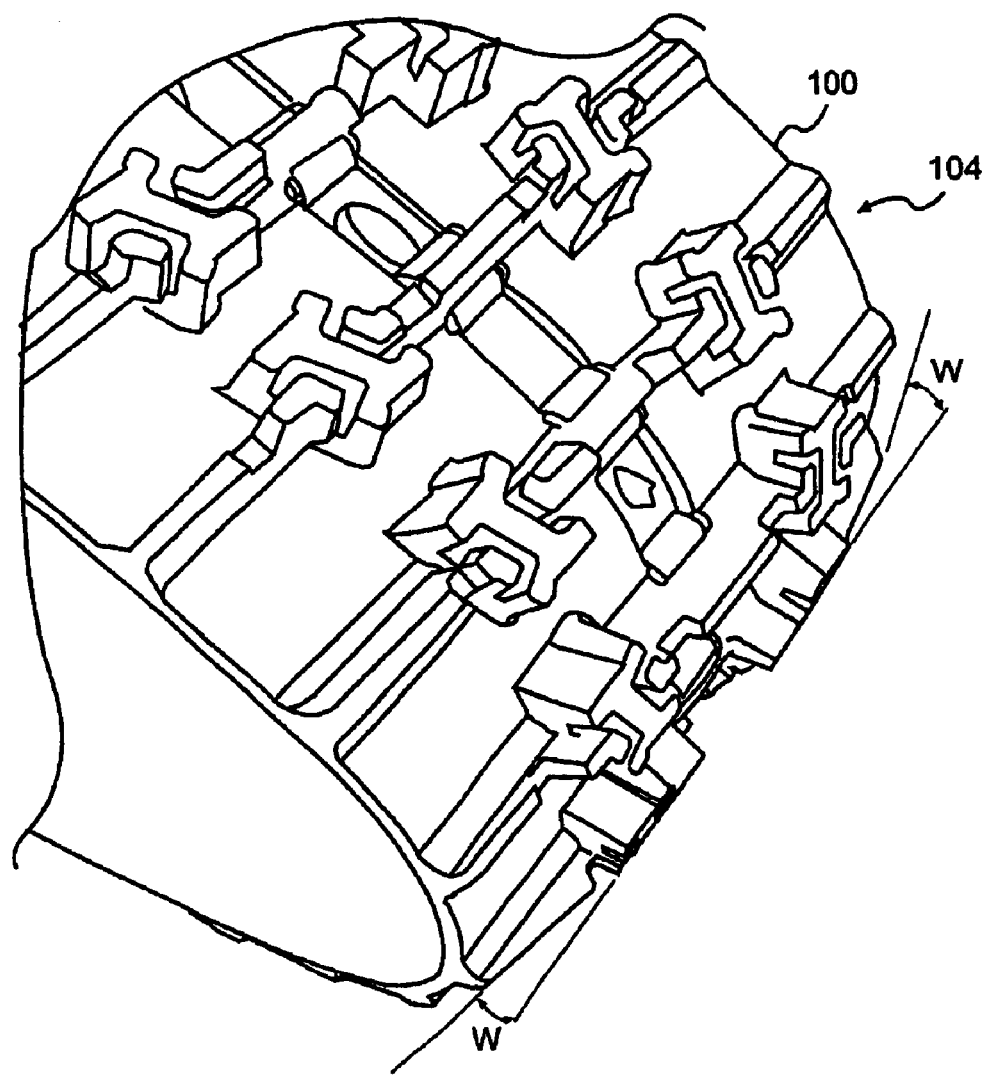
FIG. 11a depicts the profile of the endless belt used to steer the vehicle.
Figure 11B:
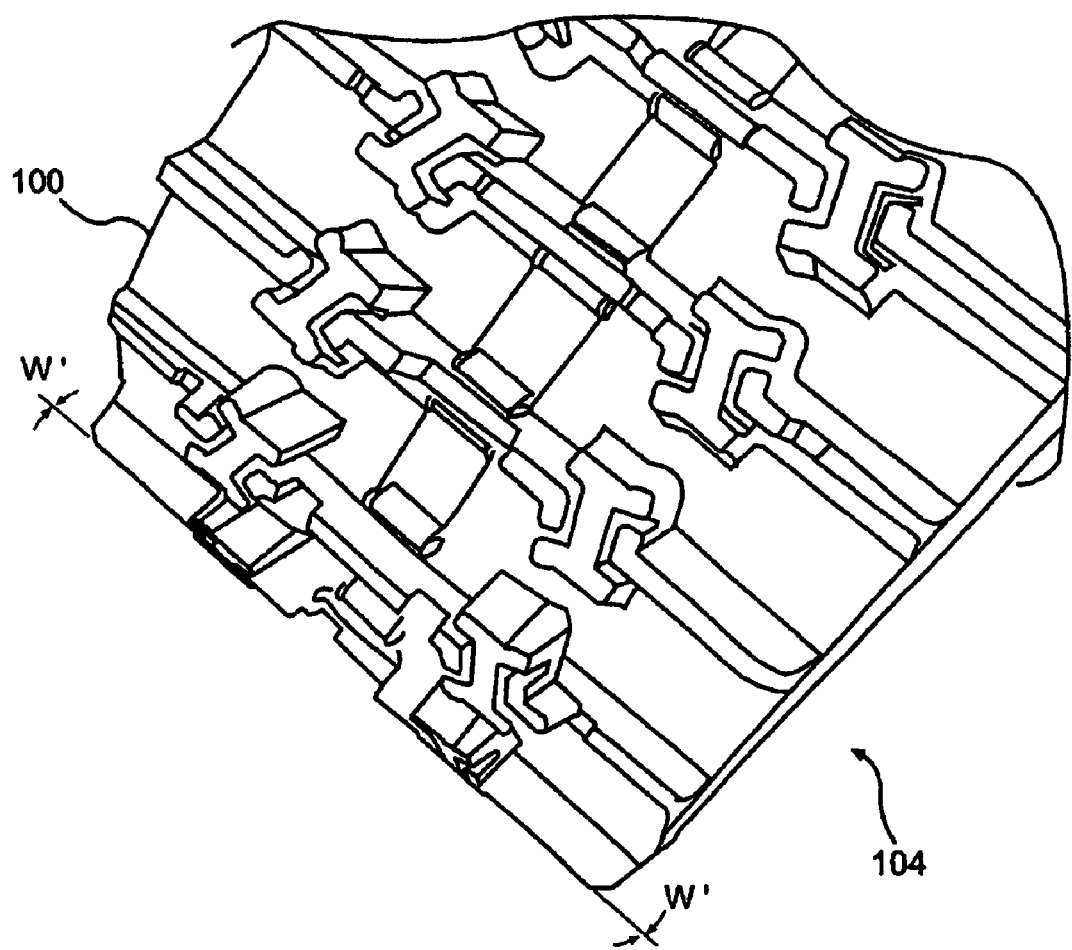
FIG. 11b depicts the profile of the endless belt not used to steer the vehicle.

The tread profile on the steering endless belts are different in order to improve steerability of the vehicle. Because the steering endless belt has to pivot over the steering axis, the sides of the steering endless belt treads are disposed at an angle ω from the surface dictated by the surface of the belt. As shown on FIG. 11a, the angle ω diminishes the force needed to turn the endless belt over the steering axis. The tread protrusions are smaller the further they are from the steering axis. Using a tread profile with the angle w on the sides may help improve steerability but has also the effect to reduce traction on the snow. Using a different profile on the steering endless belt systems as opposed to non-steering belt systems (as seen on FIG. 11b) allows to one get a lighter steering on the front end and a optimal traction on the rear end.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

The invention claimed is:

1. A drive system suitable for use on a vehicle having:
    a frame having a front portion, a rear portion and a longitudinal axis;
    an engine supported by the frame;
    a seat supported by the frame to accommodate a rider;
    a manually-operable steering device connected to the frame to accept steering input from the rider;
the drive system comprising:
    a drive-system frame operatively connectable to the frame of the vehicle so as to be capable of pivotal movement with respect the frame of the vehicle relative to the longitudinal axis of the vehicle such that the drive system may be pivoted to steer the vehicle, the drive system being operatively connectable to the steering device of the vehicle;
    a sprocket wheel rotatably supported about a sprocket wheel axis on the drive-system frame and operatively connectable to the engine;
    a ground-engaging endless belt movably disposed on the drive-system frame and engaging with the sprocket wheel to propel the vehicle along the ground; and
    when the drive system is connected to the vehicle, and when the vehicle is on flat level terrain, the drive system has a steering axis, about which the drive system pivots to steer the vehicle, a load axis, being defined by a resultant load statically equivalent to the distribution of loads across a contact area of the endless belt with the ground, and a point of intersection of the load axis and the ground is longitudinally forward of a point of intersection of the projection of the steering axis onto the ground and the ground as well as the sprocket wheel axis, whereby the drive system has a negative trail.

2. The drive system of claim 1, wherein a longitudinal distance between the point of intersection of the load axis and the ground and the point of intersection of the projection of the steering axis onto the ground and the ground is not greater than 250 mm.

3. The drive system of claim 1, wherein a longitudinal distance between the point of intersection of the load axis and the ground and the point of intersection of the projection of the steering axis onto the ground and the ground is not greater than 150 mm.

4. The drive system of claim 1, wherein a longitudinal distance between the point of intersection of the load axis and the ground and the point of intersection of the projection of the steering axis onto the ground and the ground is not less than 10 mm and not greater than 100 mm.

5. The drive system of claim 1, wherein a longitudinal distance between the point of intersection of the load axis and the ground and the point of intersection of the projection of the steering axis onto the ground and the ground is not less than 40 mm and not greater than 45 mm.

6. The drive system of claim 1, wherein a caster of the steering axis is positive.

7. An all-terrain vehicle, comprising:
a frame having a front portion, a rear portion and a longitudinal axis;
an engine supported by the frame;
a straddle seat supported by the frame to accommodate a rider;
a handlebar connected to the frame to accept steering input from the rider;
a first drive system, being a drive system as recited in claim 1, disposed on a front left side of the vehicle; and
a second drive system, being a drive system as recited in claim 1, disposed on a front right side of the vehicle.

8. A drive system suitable for use on a vehicle having:
a frame having a front portion, a rear portion and a longitudinal axis;
an engine supported by the frame;
a seat supported by the frame to accommodate a rider;
a manually-operable steering device connected to the frame to accept steering input from the rider;
the drive system comprising:
a drive-system frame operatively connectable to the frame of the vehicle so as to be capable of pivotal movement with respect the frame of the vehicle relative to the longitudinal axis of the vehicle such that the drive system may be pivoted to steer the vehicle, the drive system being operatively connectable to the steering device of the vehicle;
a sprocket wheel rotatably supported about a sprocket wheel axis on the drive-system frame and operatively connectable to the engine;
a ground-engaging endless belt movably disposed on the drive-system frame and engaging with the sprocket wheel to propel the vehicle along the ground; and
when the drive system is connected to the vehicle, and when the vehicle is on flat level terrain, the drive system has a steering axis defining a positive caster angle with vertical about which the drive system pivots to steer the vehicle, a load axis, being defined by a resultant load statically equivalent to the distribution of loads across a contact area of the endless belt with the ground, and a point of intersection of the load axis and the ground is longitudinally forward of a point of intersection of the projection of the steering axis onto the ground and the ground, whereby the drive system has a negative trail.

* * * * *